(12) United States Patent
Ganesan et al.

(10) Patent No.: US 11,978,058 B2
(45) Date of Patent: May 7, 2024

(54) SYSTEM AND METHOD FOR WARRANTY CUSTOMIZATION BASED ON CUSTOMER NEED AND PART FAILURE RATE

(71) Applicant: Dell Products, L.P., Round Rock, TX (US)

(72) Inventors: Vaideeswaran Ganesan, Bangalore (IN); Chandrasekhar R, Bangalore (IN); Rekha Ms, Karnataka (IN); Harish Babu, Bangalore (IN); Praveen Lalgoudar, Bangalore (IN); Nikhil S, Thiruvananthapuram (IN); Pandiyan Varadharajan, Bangalore (IN); Rushyendra Velamuri, Bangalore (IN); Nidhi Kant Arora, Bangalore (IN); Sandeep Venkatesh Pai, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/409,861

(22) Filed: Aug. 24, 2021

(65) Prior Publication Data
US 2023/0029219 A1   Jan. 26, 2023

(30) Foreign Application Priority Data
Jul. 23, 2021   (IN) .............................. 202111033239

(51) Int. Cl.
G06Q 30/0207   (2023.01)
G06Q 30/012    (2023.01)
H04L 41/5009   (2022.01)

(52) U.S. Cl.
CPC ....... *G06Q 30/012* (2013.01); *G06Q 30/0207* (2013.01); *H04L 41/5012* (2013.01)

(58) Field of Classification Search
None
See application file for complete search history.

(56) References Cited

U.S. PATENT DOCUMENTS

| | | | |
|---|---|---|---|
| 7,373,307 B2 * | 5/2008 | Merkin ................. | G06Q 40/06 705/4 |
| 10,657,454 B2 * | 5/2020 | Singh .................... | G06N 7/01 |

(Continued)

OTHER PUBLICATIONS

F. After, "How Predictive Analytics Optimizes Warranty Marketing", available on May 15, 2020 from https://afterinc.com/2018/11/21/predictive-analytics-optimizes-warranty-marketing/ (Year: 2020).*

*Primary Examiner* — Sam Refai
(74) *Attorney, Agent, or Firm* — Fogarty LLP

(57) ABSTRACT

Systems and methods provide customers with a need-based warranty using a deep learning neural network. After categorizing, a customer need is mapped to a warranty type based on the SLA needs. Warranties may then be suggested based on customer need. In another embodiment, systems and methods detect an optimal warranty based on part failure and performance of a server. A mean time to resolve or replace can be minimized in future failure instances by comparing the derived replacement time with available warranty offerings to identify potential deviations and thereby recommend an optimal warranty from the available offerings. In a further embodiment, systems and methods identify and offer additional service contracts for vender services. A warranty proposer looks for warranty types that are emitted by a warranty-types analyzer and by a technical-support analyzer. The overlapping warranty offers are provided to customers.

20 Claims, 4 Drawing Sheets

(56) References Cited

U.S. PATENT DOCUMENTS

| | | | |
|---|---|---|---|
| 11,441,800 B2* | 9/2022 | Rowswell | F24F 11/56 |
| 2008/0103785 A1* | 5/2008 | Logan | G06Q 30/012 |
| | | | 705/302 |
| 2012/0179824 A1* | 7/2012 | Jackson | H04L 47/827 |
| | | | 709/226 |
| 2012/0221733 A1* | 8/2012 | Greene | G06Q 10/10 |
| | | | 709/226 |
| 2019/0213600 A1* | 7/2019 | Dinwiddie | G06Q 30/012 |

* cited by examiner

SYSTEM AND METHOD FOR WARRANTY CUSTOMIZATION BASED ON CUSTOMER NEED AND PART FAILURE RATE

CROSS REFERENCE TO RELATED APPLICATIONS

This patent application claims priority to co-pending, commonly assigned Indian Patent Application No. 202111033239, filed Jul. 23, 2021 and entitled "System and Method for Warranty Customization Based on Customer Need and Part Failure Rate," the entire contents of which are incorporated by reference herein.

FIELD

The present disclosure generally relates to warranties for data centers and, more particularly, to identifying optimal warranties for data centers using deep learning algorithms based upon required criticality in view of workloads and historical service requirements at the data center.

BACKGROUND

Information Handling Systems (IHSs) process, compile, store, and/or communicate information or data for business, personal, or other. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing any downtime. A data center may include a wide variety of hardware systems and software applications that may each be separately covered by warranties. The warranties available for a particular data center are typically based upon the tier of the city where the data center is located, the type of devices in the data center, and customer preferences. An IT operation center may manage IHSs residing in multiple geographic locations. The applicable warranty for those IHs depends on where the server is located. Accordingly, an IT operation center may have to deal with different warranties across different data centers.

SUMMARY

Systems and methods provide customers with a need-based warranty using a deep learning neural network. A customer need category database contains the customer need details. Warranties are published based on known hardware and software features, and so the needs are populated based on that information. A warranty category database contains a mapping of warranty details based on warranty type, criticality, product, and support type. Environment settings from a service management tool are used to extract the defined customer needs, such as support time SLAs, product, etc. A system management console maps environment settings and category to the customer need category and warranty category databases. The system management console additionally monitors the environment to compute the actual needs through a deep learning neural network. The deep learning neural network is trained on customer need parameters and on warranty parameters. The deep learning neural network algorithm generates a prediction for customer need as one of critical, high, medium, or low SLA needs. The deep learning neural network algorithm also predicts warranty categories as critical, high, medium, or low SLA needs. After categorizing, the customer need is mapped to the warranty type based on the SLA needs. Warranties may then be suggested based on customer need.

In another embodiment, systems and methods detect an optimal warranty based on part failure and performance of a server. An artificial intelligence or machine learning algorithm is used to derive a current mean time to resolve or replace (MTTR) from server logs and part replacement history. To derive MTTR, the artificial intelligence or machine learning algorithm process the input data to filter service logs for required parameters, such as the alerts generated from the device. Then the MTTR is calculated for each server from the processed data based on when part replacements occurred in the environment and the time taken to resolve the issue. Warranty SLAs that can minimize MTTR are identified, and available warranty offerings are fetched from the warranty server. The derived MTTR is compared against SLAs of available warranty offerings. The warranty offerings that can provide a lower MTTR than the derived MTTR are listed for each server. The existing warranty is compared with the derived warranties. A list of better warranties is recommended to the customer. MTTR can be minimized in future failure instances by comparing the derived MTTR with available warranty offerings to identify potential deviations and thereby recommend an optimal warranty from the available offerings.

In a further embodiment, systems and methods identify and offer additional service contracts for vender services. When current warranty data is analyzed, a number of gaps are identified in the offers. Two artificial intelligence solutions are merged together to provide a recommendation engine to fill gaps in warranty coverage. A warranty-types analyzer analyzes warranty types and identifies gaps in the system. Every warranty is separated into different components through using natural language processing. The warranty-types analyzer then emits any identified gaps in the warranty types that are not offered by the vendor. A technical-support analyzer analyzes customer cases, replacement data, and application offers. The application and feature offers are normalized with the application offers. Then the technical-support analyzer analyzes the customer cases and replacement scenarios. Given a tuning parameter, such as a cut-off threshold, the technical-support analyzer will emit possible warranty types and their occurrences. A warranty proposer looks for the warranty types that are emitted by the warranty-types analyzer and are also emitted by the technical-support analyzer. The overlapping warranty offers are provided to customers.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
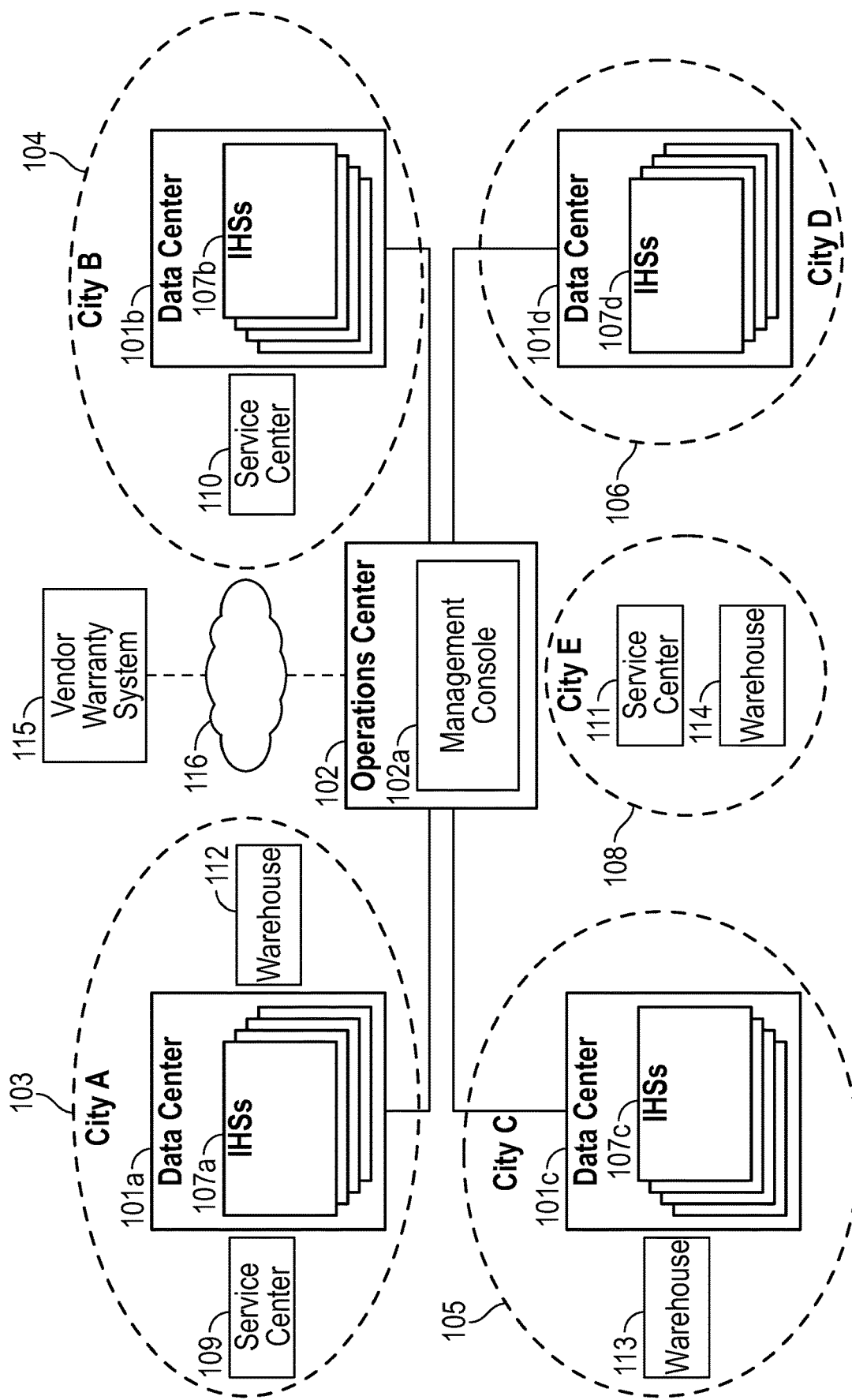
FIG. 1 is a block diagram illustrating a plurality of data centers that are managed by a central operations center according to an example embodiment.

FIG. 1 is a block diagram illustrating a plurality of data centers 101a-d that are managed by a central operations center 102. Each data center 101a-d is located in a different city 103-106. Data centers 101a-d may include a large number of IHSs 107a-d that may be installed as components of a chassis. Multiple chassis may be housed within a rack, and data centers 101a-d may utilize large numbers of racks, with various different types of chassis installed in the various rack configurations. By configuring a chassis with different IHS 107a-d, the chassis may be adapted to support specific types of operations, thus providing a computing solution that is directed toward a specific type of computational task. Components of the IHSs 107a-d may be provided by multiple vendors and may be installed at different times. Accordingly, data center administrators at operations center 102 need to track and assess the warranty coverage of the components within the various data centers 101a-d. Certain components of operations center 102 and/or data centers 101a-d may be configured to implement the systems and methods described herein.

IHSs 107a-d may comprise a remote access controller, baseboard management controller, or chassis management controller that allows information technology (IT) administrators at a remote operations center 102 to deploy, update, monitor, and maintain IHSs 107a-d remotely. As a non-limiting example of a remote access controller, the integrated Dell Remote Access Controller (iDRAC) from Dell® is embedded within Dell PowerEdge™ servers and provides such remote functionality.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS 107a-d may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS 107a-d may include Random Access Memory (RAM), one or more processing resources such as a Central Processing Unit (CPU) or hardware or software control logic, Read-Only Memory (ROM), and/or other types of nonvolatile memory. Additional components of an IHS 107a-d may include one or more disk drives, one or more network ports for communicating with external devices as well as various I/O devices, such as a keyboard, a mouse, touchscreen, and/or a video display. An IHS 107a-d may also include one or more buses operable to transmit communications between the various hardware components.

IHSs 107a-d may be used to support a variety of e-commerce, multimedia, business, and scientific computing applications. In some cases, these applications may be provided as services via a cloud implementation. IHSs 107a-d are typically configured with hardware and software that provide leading-edge computational capabilities. IHSs 107a-d may also support various numbers and types of storage devices. Accordingly, services provided using such computing capabilities are typically provided as high-availability systems that operate with minimum downtime. The warranties provided by vendors of IHSs 107a-d and the related hardware and software allow the data centers 101a-d to provide contracted Service Level Agreement (SLA) to customers. Upon failure of an IHS 107a-d, data centers 101a-d and operations center 102 typically relies on a vendor to provide warranty support in order to maintain contracted SLAs.

Existing warranty systems typically comprise a standard warranty for a particular device, such as an IHS, server, etc. That standard warranty is offered to customers by a vendor, such as a manufacturer, seller, re-seller, or subcontracted service agent, upon purchase of the device. In some cases, the vendor may offer an extended warranty if that option is available. The vendor may support many types of warranties, which can make it difficult for a customer representative to select the correct warranty type applicable for the customer product. For a larger customer accounts, the vendor may allocate a dedicated Technical Account Manager (TAM), who can analyze the customer requirements and help the customers with required warranty types. Unfortunately, customers may experience extended system downtime or degraded functionality when a non-optimal warranty has been purchased for the device. There are multiple reasons that contribute to the selection of a non-optimal warranty, such as limited understanding of cost or available warranty offerings, or changes in device usage or intent after purchase.

Warranties typically have common features, such as warranty type that identifies the covered component types (e.g., software or hardware), a warranty replacement SLA that identifies the level of services expected by the customer from the vendor (e.g., next business day (NBD), second business day (SBD), four hours (4 H), eight hours (8 H), mission critical (MC), etc.), and a support type that identifies the types of support provided (e.g., engineer/technician level one, two, or three (L1, L1+L2, L1+L2+L3), Post Support, etc.) or other support based on standard naming conventions. The warranty will also identify a warranty start date and a warranty end date. The warranty SLA can have a significant impact on the customer's operations. For example, a server with an SBD warranty may experience downtime up to two days, which could have been reduced to four hours if a 4 H response warranty was in place.

In the illustrated embodiment of FIG. 1, data centers 101a-d are located in different cities 103-106, and each city 103-106 has different levels of service available. Another city 108 may provide vendor warranty support but has no data center associated with operations center 102. Service centers 109 and 110, respectively, are available in cities 103 and 104. Accordingly, if on-site technical support is needed, then data centers 107a,b would have the necessary support type available locally. On the other hand, data centers 107c,d would have to rely on support from service centers 109-111 in another city. Service centers 109-110 may also be staffed so that various combinations of support levels (e.g., L1, L1+L2, L1+L2+L3) may be available at different service centers. Similarly, warehouses 112, 113, respectively, are available in cities 103 and 105. Accordingly, if replacement parts are needed, then data centers 107a,c would more likely have the required parts available locally. On the other hand, data centers 107b,d would have to rely on parts shipped from warehouses 112-114 in another city. Cities 103-106 may be ranked as Tier 1, Tier 2, etc. based upon the availability of service centers and warehouses. The operations center 102, or a system management console 102a may be in contact with a vendor warranty system 115 either directly or through a public network 116, such as the Internet. Vendor warranty system 117 may track warranty terms and coverage for deployed IHSs 107a-d.

There can be gaps in warranty offers. For example, while some of warranty offers may have three warranty types (e.g., L1, L1+L2, L1+L2+L3), in other warranties only L1 or L1+L2 might be offered. Moreover, in some cases a warranty offers coverage for products such as system management software; however, other warranty offers may not provide such coverage. At times, there may be high volume of requests for support or part replacement that is not usually covered by warranty offers. If the volume of such requests increases, then the vendor may need to offer warranties with appropriate coverage, which would increase warranty revenue and increase customer confidence.

Certain scenarios can create unpleasant customer experiences if the wrong warranty is in place. For example, a server's performance may be degraded for an extended time due to redundant part failures, such as failure of one drive in a Redundant Array of Independent Disks (RAID) virtual disk. A server may experience extended downtime due to the time required to replace a failed critical part, such as a CPU, memory, backplane, or system board failure. A servers may have to function with an extended risk due to redundant part failures, such as a power supply unit (PSU) or fan failure. Customer awareness of warranty coverage may also cause customer dissatisfaction. For example, if a customer is not aware that a certain failure is within warranty support, then the customer will never report the issue and may instead request part replacement, which may result in unnecessary downtime and cost that could have been avoided.

Currently, there is no mechanism to determine if the warranty purchased by a customer meets the needs of the customer environment. Customer need may be derived based a defined customer environment context. This context helps to identify the criticality of support required by the customer for better availability and serviceability. An automated solution to ease this process would reduce unnecessary downtime and would minimize unpleasant customer experiences.

Figure 2:
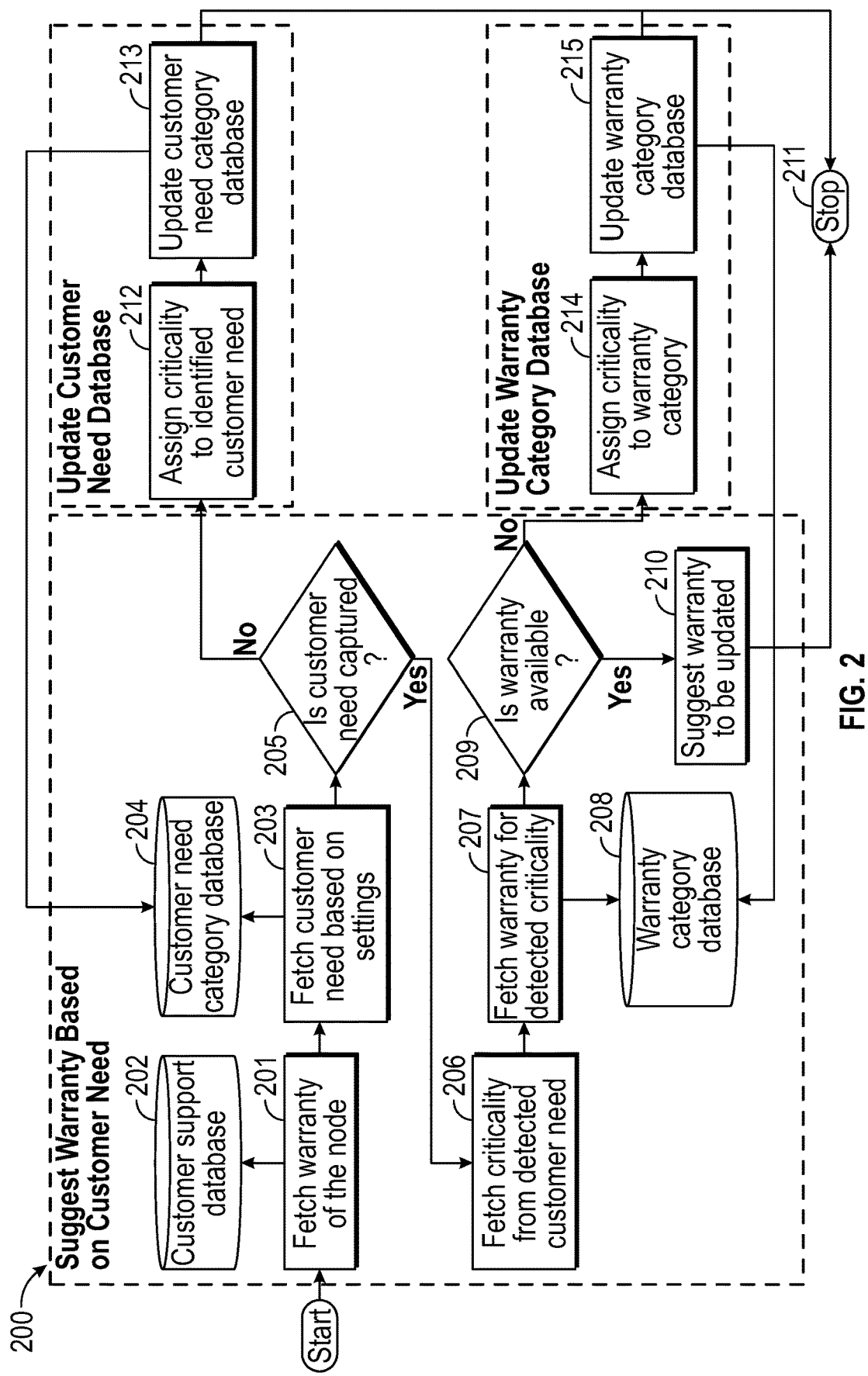
FIG. 2 is a flowchart illustrating a process for suggesting customer warranties based on customer need, such supporting certain workloads or meeting certain availability.

FIG. 2 is a flowchart illustrating a process 200 for suggesting customer warranties based on customer need, such supporting certain workloads or meeting certain availability. Starting a step 201, a warranty for a given node is fetched from customer support database 202. In step 203, customer needs are fetched from a customer need category database 204. The customer need category database 204 contains the customer need details. Warranties are published based on known hardware and software features and, therefore, the customer needs may be populated based on that information. For example, customer needs may include a support time SLAs (e.g., Mission Critical, 4-hour, 8-hour, NBD, SBD, etc.) and/or product name or type (e.g., particular hardware or software).

In step 205, a determination is made whether the customer's needs are captured. If the needs are captured, then the process moves to step 206 and a criticality (e.g., MC, 4 H, 8 H, NBD, SBD) is fetched from the customer need. In step 207, a warranty is fetched from warranty category database 208. In one embodiment, warranty category database 208 contains a mapping of warranty details based on warranty type, criticality, product, and support type as given below. This mapping may be, for example: {"type": "prosupport", "critical": "MissionCritical", product: "VirtualStorageAreaNetwork", supportType: "AdvancedSoftwareSupport"}.

The customer support database 202, customer need category database 204, and warranty category database 208 may be maintained by the vendor. The databases may be in communication with a customer data center to collect information from an IT service management (ITSM) tool, support assistant console, or systems management console, for example. Environment settings from an ITSM tool may be used to extract defined customer needs, such as support time SLAs, products, etc. A data center console may be used to map an environment setting or category to customer need category database 204 and warranty category database 208. The data center consoles may monitor the environment to compute actual needs through a deep learning neural network (DLNN). Data center servers and IHSs are scanned for products that are installed but are not defined in a service management application. Parameters such as redundancy, disaster recover (DR) enablement, and virtual machine (VM) priorities are used to analyze the customer's unstated support time SLA needs. VM priority is used to determine how critical workloads get precedence over other workloads and can be used to indirectly determine support time SLA. The presence of high priority workloads requires higher support time SLA needs. Workload types (e.g., whether they are storage intensive or network intensive) are analyzed in conjunction with the VM proprieties to determine hardware support time SLA. An unusual number of certain alert categories, such as CPU errors, can also be used to determine the Support Time SLA.

The DLNN may be an artificial intelligence (AI) or machine learning (ML) engine or processor that executes software instructions that operate to combine large amounts of data with fast, iterative processing and intelligent algorithms, which thereby allow the software to automatically learn from patterns and features in the data. The DLNN may use machine learning, which automates analytical model building using methods from neural networks and statistics to find insights into data without explicitly programming regarding what to look for and what to conclude. A neural network is made up of interconnected units that processes information by responding to external inputs and relaying information between each unit. The process may require multiple iterations processing the data to find connections and derive meaning from unstructured data. The DLNN may use advanced algorithms to analyze large amounts of data faster and at multiple levels. This allows intelligent processing for identifying and predicting rare events, understanding complex systems, and identifying unique scenarios. The DLNN may use application programming interfaces (APIs) to add functionality to existing systems and software. The DLNN can reason on input data and output an explanation of the data.

DLNN algorithms for customer need categorization and warranty categorization are trained using an appropriate set of parameters. For customer need categorization, the DLNN is trained using customer need parameters, such as products installed, redundancy, DR enablement, VM priorities, workload types, alerts. etc. The customer need data is categorized by assigning weights and bias to each parameter. The algorithm generates a prediction for the customer need as critical, high, medium, or low SLA needs.

For warranty categorization, the DLNN is trained with warranty parameters, such as products, type of warranty, criticality, and support type. The warranty data is categorized by assigning weights and bias to each parameter and predicting for warranty category as critical, high, medium, or low SLA needs.

These details are stored in the customer need category and the warranty category databases. After categorizing, the customer need is mapped to the warranty type based on the SLA needs. That is, customers requiring critical SLA needs are mapped to a critical category warranty.

In step 209, a determination is made whether the appropriate warranty (i.e., matching the customer's needs) is available. If such a warranty is available, then the process moves to step 210 where a suggestion is presented to the customer to update their current warranty. The suggested warranty is selected based on customer need. For example, if a customer may have a storage area network (SAN) product installed and listed in a service management application. Support time SLA for this environment may be defined as NBD. The current warranty for the customer's system is: "Pro support, Next Business Day (NBD), SAN, Enterprise Software Support." A support assistant console or systems management console computes a refined SLA and, due to the presence of high critical VMs, the SLA is determined as Mission Critical. These aspects (i.e., Mission Critical SLA, and SAN product) are looked up in the customer need category database 204 and the warranty category database 207. It is determined at step 209 that a "Pro support, Mission Critical, SAN, Advanced Software Support" warranty is required for this detected customer need. Accordingly, at step 210, this warranty is offered to customer. The customer may also be provided with details regarding the need for a warranty update, such as the change in SLA. The customer may accept or decline the warranty update and the process ends at step 211.

If a customer need is not found in customer need database 204, then the database 204 is updated as new environments are detected. At step 205, a determination is made whether the customer's needs are captured. If the needs are not captured, then the process moves to step 212 where a criticality is assigned to the customer need based on historical customer data. In step 213, the customer need category database 204 is updated with this new need and assigned criticality. After this update, any further query for the updated customer need will return the criticality required.

In step 209, a determination is made whether the appropriate warranty is available. If a warranty for the detected criticality or the customer need is not available, then in step 214 the criticality is assigned to a warranty category. In step 215, the warranty category database 208 is updated based on historical customer data. Following this update, any further query for the detected warranty category will be returned based on the criticality category and product.

The process 200 for offering a customer-need based warranty shown in FIG. 2 provides for dynamically updating a warranty based on customer need and dynamically updating criticality based on customer need. The process 200 offers a method to fetch a warranty based on criticality and to automate a criticality-based warranty suggestion in order to prevent customer data center disruption due to warranty expiration in a critical customer environment. The process 200 also serves as a method for suggesting warranty renewal based on criticality and for capturing customer needs to suggest warranties.

In another embodiment, a vendor may allow customers to detect an optimal warranty based on part failure and/or performance of a server. Customers with a non-optimal warranty on their system may experience extended system downtime or degraded functionality. Embodiments are directed to a method to derive a current Mean Time To Resolve/Replace (MTTR) based on server logs and part-replacement history using an AI/ML algorithm (i.e., a deep learning model). The MTTR in future failure instances can be minimized by comparing a derived MTTR with available offerings to identify potential deviations and to recommend an optimal warranty from the available offerings. Customers can be notified of a warranty with a higher SLA that could result in a lesser MTTR. The customer may upgrade a current warranty or procure future products with the higher SLA warranty.

Figure 3:
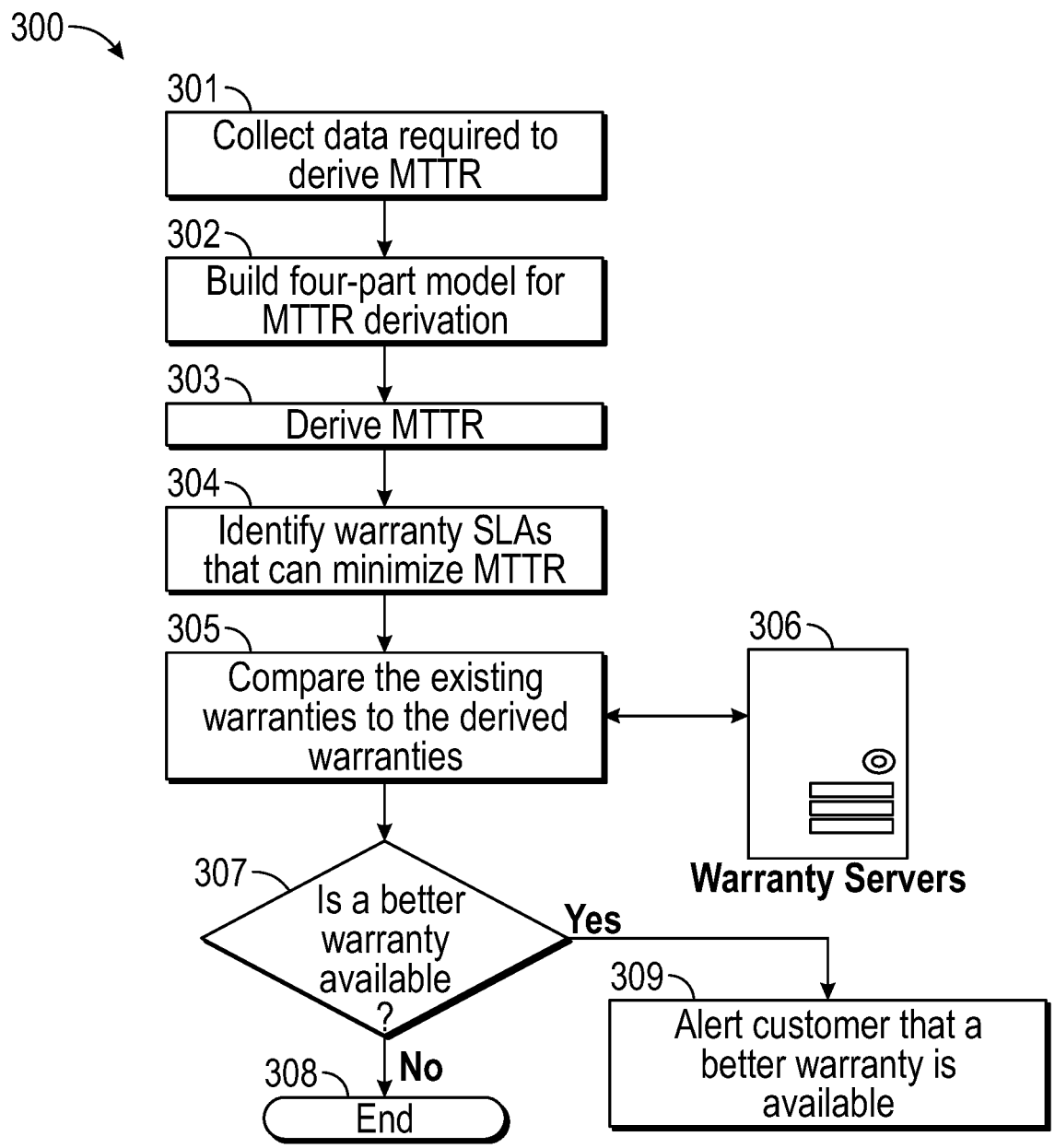
FIG. 3 is a flowchart for a process for determining an optimal warranty based on part failures and server performance.

FIG. 3 is a flowchart for a process 300 for determining an optimal warranty based on part failures and server performance. In step 301, the data needed to derive MTTR is collected. This may include, for example, obtaining a system inventory along with serial numbers and vendor details. Using the system serial numbers, life cycle logs and part replacement histories are collected from a system management console. This information may be based on alerts from a server before and after servicing (e.g., when a part failed, and when a part came back up) and when a serial number changed.

In step 302, a four-step model for MTTR derivation is created using the data gathered in step 301. With the available data, the total process of failure to part replacement can be segregated into four major components. Component 1 is the time taken from a failure occurrence to a service case being created. Component 2 is the time elapsed from when the case is created to identification of a failure part. Component 3 is the time required to ship a replacement part from when the failed part was identified. Component 4 is the time taken to install the replacement part and get the server running again.

In step 303, the MTTR is derived from the input data set using an AI/ML algorithm. First the input data is processed to filter out the required parameters from server logs. This includes collecting alerts, such as warning, critical, and normal alerts, that are generated by the server. Second, the MTTR for each server is calculated using the processed data. Part replacements that occurred in the environment are identified, and the time required to resolve the issues is computed, such as the time taken for transitions between a warning to a normal alert or a critical alert to a normal alert.

In step 304, the warranty SLAs that can minimize MTTR are identified. The available warranty offerings are fetched from a warranty server. Then the derived MTTR is compared against SLAs of the available warranty offerings. The warranty offerings that can provide a lower MTTR than the derived MTTR are identified for each server.

In step 305, the existing server warranties are compared with derived warranties. Each derived SLA is compared with an existing SLA on the warranty server 306. A final list of warranties that have a lesser MTTR than an existing warranty are provided.

In step 307, a determination is made whether a better warranty is available. If no better warranty is available, then the process ends at step 308. Otherwise, in step 309 the customer is alerted that a better warranty is available. The customer may be provided with better warranties, which may identify the suggested warranties along with differentiating factors.

The method of detecting optimal warranty illustrated in flowchart 300 may be triggered at scheduled intervals or on demand to find the optimal warranty for systems.

In other embodiments, a vendor may identify and offer warranties to customers using AI. An analysis of current warranty data has identified a number of gaps in the warranty offers. For example, while some of the offers have three warranty types (L1, L1+L2, L1+L2+L3), other warranty offers may not offer each type. Moreover, in some cases the warranty offers are available for some products, but the offers do not match warranty offers for other products where such distinctions are also applicable. In some cases, there may be high volume of support or part-replacement requests that are not usually covered by warranty offers. If the volume of traffic is high, then it probably makes sense for the vendor to offer warranties and thereby increase the warranty revenue while increasing the confidence of customer. In other cases, a customer may refrain reaching out to the vendor support team if a particular issue is not be related to the vendor's services; however, the issue may be within the vendor's services support agreement.

Figure 4:
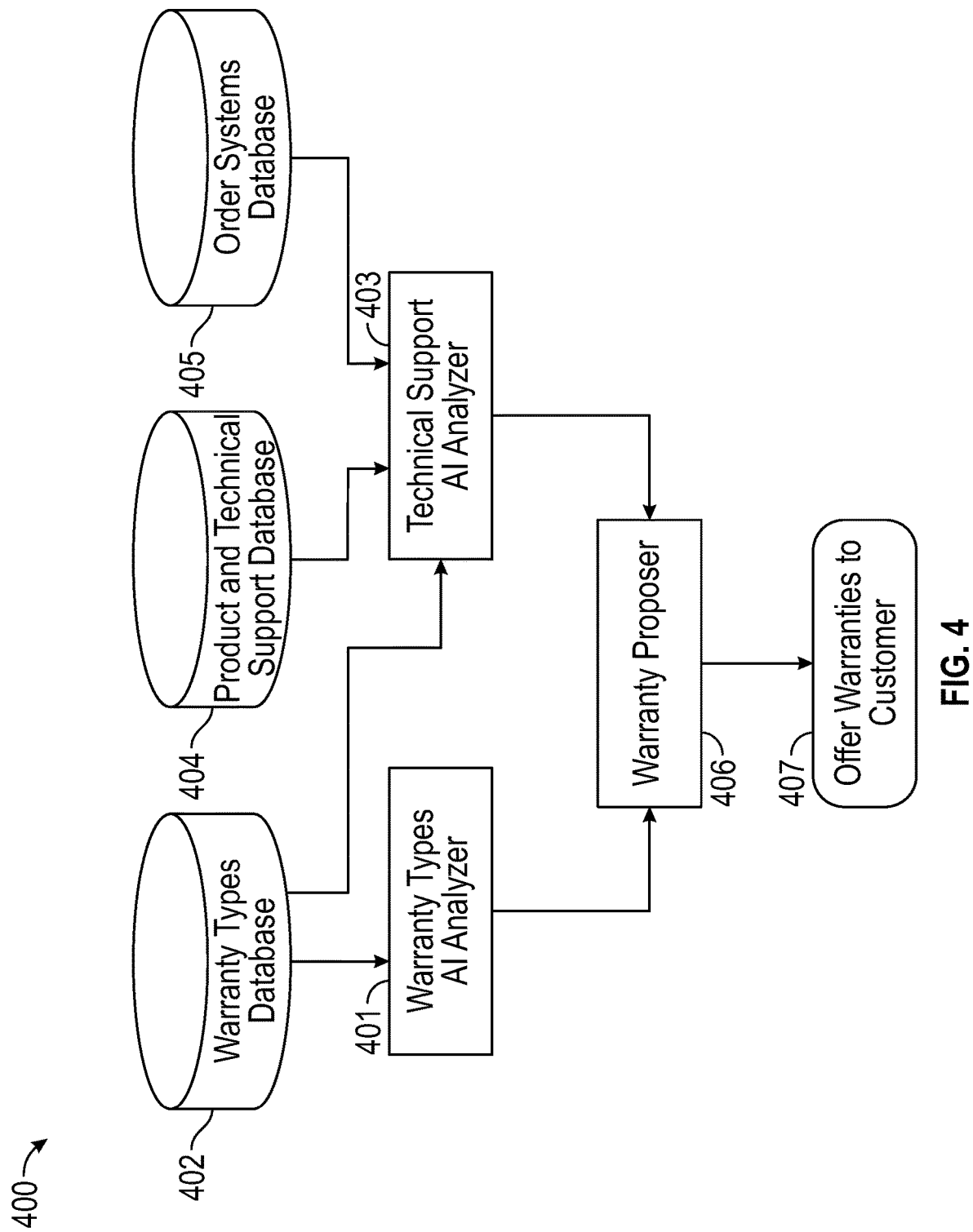
FIG. 4 is a block diagram illustrating a warranty recommendation engine according to an example embodiment.

One response to these problems involves merging two AI solutions together to provide a warranty recommendation engine. FIG. 4 is a block diagram illustrating a warranty recommendation engine 400 according to an example embodiment. A warranty-types AI analyzer 401 analyzes warranty types and identifies gaps in the system. Using a warranty-types database 402, every warranty is spliced into different components using natural language processing (NLP) analysis of warranty language. The warranty components may comprise, for example, replacement type, SLA, type of support, post-support needs, software level, application, and feature. Warranty-types AI analyzer 401 then outputs any identified gaps in the warranty types that are not currently offered by the vendor. Warranty-types AI analyzer 401 may also normalize warranty offer names.

A technical-support AI analyzer 403 pulls data from warranty-types database 402, product and technical-support database 404, and order systems database 405. Technical-support AI analyzer 403 analyzes the customer cases, replacement data, and application offers and normalizes the application and feature offers. Then technical-support AI analyzer 403 analyzes the customer cases and replacement scenarios. Given a tuning parameter, such as a cut-off threshold set by the vendor, technical-support AI analyzer 403 will output the possible warranty types and their occurrences.

A warranty proposer 406 receives the identified gaps in the warranty types from the warranty-types AI analyzer 401 and the possible warranty types from the technical-support AI analyzer 403. Warranty proposer 406 looks for those warranty types that are emitted by warranty-types AI analyzer 401 and are also emitted by the technical-support AI analyzer 403. This ensures that the warranty offers 407 provided to customers are good for both the vendor as well as the customer.

Warranty recommendation engine 400 provides the ability to identify gaps in warranty offers and to highlight the gaps for business scrutiny and possible revenue generation. Additionally, this provides product and feature name normalization across the warranty offers and the case workload to identify opportunities for warranty generation. The recommended warranties output by warranty proposer 406 leverage the technical-support workload 404 and business parameters 405 to propose warranty types that are viable for the vendor's business.

In an example embodiment, a customized warranty system for providing a warranty solution to meet needs of a customer environment comprises a processor and a memory coupled to the processor. The memory has program instructions stored thereon that, upon execution by the processor, cause the system to identify a customer need from a customer need category database based on environment settings for a customer device; determine whether the customer need is met by a current warranty for the device; identify a criticality from the customer need using a deep learning neural network algorithm; retrieve, from a warranty category database, a proposed warranty that matches the criticality using the deep learning neural network algorithm; and recommend the proposed warranty to the customer. The criticality may comprise a critical, high, medium, or low SLA need.

The deep learning neural network algorithm may be trained for customer need categorization using one or more parameters selected from the group: products installed, redundancy, disaster recover enablement, virtual machine priorities, workload types, and alerts. The customer need comprises a critical, high, medium, or low SLA need.

The deep learning neural network algorithm may be trained for warranty categorization using one or more parameters selected from the group: products, warranty type, criticality, and support type.

The environment settings for the device may comprise one or more of redundancy, disaster recover enablement, virtual machine priorities, workload types, and alert categories.

The instructions may further cause the customized warranty system to, if the customer need is not found in the customer need database, update the customer need database to include a new customer need, wherein a criticality is assigned to the new customer need based on historical customer data.

if a warranty for the criticality is not found in the warranty category database, update the warranty category database based on historical customer data.

In another example embodiment, a customized warranty system for providing a warranty based on device performance comprises a processor and a memory coupled to the processor. The memory has program instructions stored thereon that, upon execution by the processor, cause the system to collect data required to derive a current MTTR; build a model for MTTR derivation; derive the MTTR using a machine learning algorithm; identify a desired SLA that can minimize the current MTTR; determine whether an existing warranty with the desired SLA is available; and if a warranty with the desired SLA is available, then recommend the existing warranty to the customer.

The data required to derive a current MTTR in the customized warranty system may comprise one or more of: a system inventory, a system serial number, a life cycle log, a part replacement history, and a time required to replace parts.

The model for MTTR derivation in the customized warranty system may comprise a time from part failure to service case creating, a time from service case creation to failed part identification, a shipping time for a replacement part, and an install time for a replacement part.

Deriving the MTTR using a machine learning may further cause the system to process the required data to filter life cycle logs; and calculate an MTTR for a plurality of devices.

The instructions may further cause the customized warranty system to: collect alerts generated by the device; identify part replacements that occurred in a device environment; and compute a time required to resolve the alerts.

The instructions may further cause the customized warranty system to: retrieve available warranty offers from a warranty server; compare a derived MTTR to SLAs in the available warranty offers; and identify one or more warranty offers that provide a lower MTTR than the derived MTTR.

In a further example embodiment, a customized warranty system for identifying warranty needs based on gaps in existing coverage comprises a warranty-types analyzer comprising an artificial intelligence processor configured to analyze available warranty types and to identify gaps in the available warranty types; a technical-support analyzer comprising an artificial intelligence processor configured to analyze customer cases, part-replacement data, and application offers; and a warranty proposer configured to identify warranty types that are received from both the warranty-types analyzer and the technical-support analyzer.

The warranty-types analyzer may be further configured to separate a warranty into a set of components using natural language processing. The set of components may comprise one or more of: a replacement type, an SLA, a support type, post support needs, a software level, an application, and a feature.

The warranty-types analyzer may be configured to emit any identified gaps in warranty types that are not offered by a vendor.

The technical-support analyzer may be configured to emit possible warranty types and corresponding occurrences of the possible warranty types.

The technical-support analyzer may be configured to assess warranty offers in view of case workloads.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A customized warranty system for providing a warranty solution to meet needs of a customer environment, comprising:
   a processor; and
   a memory coupled to the processor, the memory having program instructions stored thereon that, upon execution by the processor, cause the system to:
      identify a customer need from a customer need category database based on environment settings for a customer device;
      determine whether the customer need is met by a current warranty for the device;
      identify a criticality from the customer need using, by a deep learning neural network algorithm, workloads and historical service requirements at a data center housing the customer device;
      retrieve, from a warranty category database, a proposed warranty that matches the criticality using, by the deep learning neural network algorithm, the workloads and historical service requirements at the data center housing the customer device;
      recommend the proposed warranty to the customer; and
      provide warranty support, in accordance with the proposed warranty, in response to acceptance of the proposed by the customer, upon part failure in the customer device to replace one or more failed parts, and/or based on performance of the customer device to improve performance of the customer device.

2. The customized warranty system of claim 1, wherein the deep learning neural network algorithm is trained for customer need categorization using one or more parameters selected from the group: products installed, redundancy, disaster recover enablement, virtual machine priorities, workload types, and alerts.

3. The customized warranty system of claim 2, wherein the customer need comprises a critical, high, medium, or low Service Level Agreement (SLA) need.

4. The customized warranty system of claim 1, wherein the deep learning neural network algorithm is trained for warranty categorization using one or more parameters selected from the group: products, warranty type, criticality, and support type.

5. The customized warranty system of claim 4, wherein the criticality comprises a critical, high, medium, or low Service Level Agreement (SLA) need.

6. The customized warranty system of claim 1, wherein the environment settings for the device comprise one or more of redundancy, disaster recover enablement, virtual machine priorities, workload types, and alert categories.

7. The customized warranty system of claim 1, wherein the instructions, upon execution by the processor, further cause the system to:
   if the customer need is not found in a customer need database, then updating the customer need database to include a new customer need, wherein a criticality is assigned to the new customer need based on vendor historical customer data.

8. The customized warranty system of claim 1, wherein the instructions, upon execution by the processor, further cause the system to:
if a warranty for the criticality is not found in the warranty category database, then updating the warranty category database based on vendor historical customer data.

9. The customized warranty system of claim 1, wherein identifying the criticality from the customer need using, by the deep learning neural network algorithm, workloads and historical service requirements at a data center housing the customer device further comprises monitoring the data center and computing an actual customer need through the deep learning neural network.

10. The customized warranty system of claim 9, wherein:
monitoring the data center comprises scanning data center for customer devices that are installed but are not defined in a service management application; and
the deep learning neural network computes the actual customer need using parameters comprising one or more of redundancy and disaster recovery enablement, and virtual machine priorities to analyze unstated customer needs.

11. The customized warranty system of claim 10, wherein the deep learning neural network uses the virtual machine priorities to analyze unstated customer needs by determining how critical workloads get precedence over other workloads to indirectly determine unstated customer needs.

12. The customized warranty system of claim 11, wherein presence of high priority workloads result in higher unstated customer needs.

13. The customized warranty system of claim 11, wherein workload types are analyzed by the deep learning neural network in conjunction with the virtual machine priorities to determine unstated customer hardware needs.

14. The customized warranty system of claim 11, wherein a predetermined number of one alert category is used by the deep learning neural network to determine the unstated customer needs.

15. A method for providing a customized warranty solution to meet needs of a customer environment, comprising:
identifying, by an Information Handling System (IHS), a customer need from a customer need category database based on environment settings for a customer device;
determining, by the IHS, whether the customer need is met by a current warranty for the device;
identifying, by the IHS using a deep learning neural network algorithm, a criticality from the customer need, based on workloads and historical service requirements at a data center housing the customer device;
retrieving, by the IHS using the deep learning neural network algorithm, from a warranty category database, a proposed warranty that matches the criticality, based on the workloads and historical service requirements at the data center housing the customer device;
recommending, by the IHS, the proposed warranty to the customer; and
providing, through the IHS, warranty support, in accordance with the proposed warranty, in response to acceptance of the proposed by the customer, upon part failure in the customer device to replace one or more failed parts, and/or based on performance of the customer device to improve performance of the customer device.

16. The method of claim 15, wherein identifying the criticality from the customer need using, by the deep learning neural network algorithm, workloads and historical service requirements at a data center housing the customer device further comprising monitoring the data center and computing an actual customer need through the deep learning neural network.

17. The method of claim 16, wherein:
monitoring the data center comprises scanning data center for customer devices that are installed but are not defined in a service management application; and
the deep learning neural network computes the actual customer need using:
parameters comprising one or more of redundancy and disaster recovery enablement; and
virtual machine priorities, by determining how critical workloads get precedence over other workloads to indirectly determine unstated customer needs.

18. A non-transitory computer readable medium comprising program instructions stored thereon that, upon execution by an Information Handling System (IHS), cause the IHS to:
identify a customer need from a customer need category database based on environment settings for a customer device;
determine whether the customer need is met by a current warranty for the device;
identify, by a deep learning neural network algorithm using workloads and historical service requirements at a data center housing the customer device, a criticality from the customer need;
retrieve, from a warranty category database, a proposed warranty that matches the criticality using, by the deep learning neural network algorithm, the workloads and historical service requirements at the data center housing the customer device;
recommend the proposed warranty to the customer; and
provide warranty support, in accordance with the proposed warranty, in response to acceptance of the proposed by the customer, upon part failure in the customer device to replace one or more failed parts, and/or based on performance of the customer device to improve performance of the customer device.

19. The non-transitory computer readable medium method of claim 18, wherein, upon execution, the program instructions further cause the IHS to:
identify the criticality from the customer need further comprises monitoring the data center and compute, by the deep learning neural network, an actual customer need through the deep learning neural network.

20. The non-transitory computer readable medium method of claim 18, wherein, upon execution, the program instructions further cause the IHS to:
monitor the data center by scanning the data center for customer devices that are installed but are not defined in a service management application; and
compute, by the deep learning neural network, the actual customer need using:
parameters comprising one or more of redundancy and disaster recovery enablement; and
virtual machine priorities, by determining how critical workloads get precedence over other workloads to indirectly determine unstated customer needs.

* * * * *